Sept. 14, 1926.

H. H. VICKERS 1,600,023

COMBINED TYPEWRITING AND COMPUTING MACHINE

Filed Sept. 8, 1923

Inventor:
Harry H Vickers
by B.B. Stickney
Attorney

Patented Sept. 14, 1926.

1,600,023

UNITED STATES PATENT OFFICE.

HARRY H. VICKERS, OF CORONA, NEW YORK, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

Application filed September 8, 1923. Serial No. 661,540.

This invention relates to improvements in combined typewriting and computing machines, and is illustrated as applied to an Underwood bookkeeping machine, one form of which is shown in the patent to Frederick A. Hart, No. 1,270,411, dated June 25, 1918. The invention includes improvements over the patent to Walter J. Hausman, No. 1,416,023, dated May 16, 1922, and my Patent, No. 1,416,766, dated May 23, 1922.

In posting accounts on ledger-sheets, it is customary to insert in the bookkeeping machine a ledger-sheet corresponding to a customer's account and displaying in a balance column the old balance, showing the condition of the account at the end of the last posting. Such old balance is typed in an old-balance column on the ledger-sheet and run into a computing register and into a proving register. The amounts of the debits and credits are then typed in the proper columns and are concomitantly added or subtracted in the computing register to determine a new balance. No change in the proving register results from such typing of the debit and credit entries. The new balance displayed in the computing register is then typed in the balance column and concomitantly subtracted out of or added into the computing register, in accordance with the positive or negative character of said balance, thereby clearing the computing register. The star-key (see patent to Frederick A. Hart, No. 1,190,287, dated July 11, 1916), may then be operated to type a star, to show that the computing register stands at "0."

The ledger-sheet is also provided with a proof column, preferably located adjacent the right edge of the sheet, and, upon completion of the posting of an account, the old balance is typed in the proof column and subtracted from the proving register. This operation should clear the proving register, and, if the old balance is copied from the balance of the last posting, such clearing of the proving register indicates that the old balance was correctly copied at the beginning of the new posting. If, however, the operator, instead of copying in the proof column the final balance of the last posting, copies the amount in the old-balance column, the operation consists merely of subtracting out of the proving register the same amount as originally run in, thus clearing the proving register even though the amount of the old balance was incorrectly copied originally. In each of said patents, provision is made of a blind or screen for covering the amount in the old-balance column when the carriage is positioned for typing in the proof column, thereby causing the operator to resort to the original amount typed in the balance column to obtain the amount of the entry to be typed in the proof column.

An object of this invention is to provide improved means for proving the correctness of the posting of ledger-sheets. To this end provision is made of a shield or blinder mounted on the carriage to overlie, immediately above the printing line, the proof column. Provision is also made of a proving register, a computing register and an accumulating register controlled by the typewriting mechanism to compute entries made in certain columns. Upon the completion of the typing of the old balance in the proof column, the platen is line-spaced to position the entry behind the shield or blinder, and the carriage is shifted to the old-balance column and the old balance entered therein and concomitantly run into the computing register. The carriage is then shifted to another position and a debit or a credit typed and run into the accumulating register, into the computing register and into the proving register. The balance shown in the computing register is then typed in the balance column and concomitantly subtracted or added into both the computing register and the proving register, in accordance with the positive or negative character of the balance, to clear said registers and to permit the typing of a star after the balance entry. Clearing of the proof register indicates the proper entry of the old balance in the old-balance column, for, in order to clear this register, the old-balance entry must agree with the entry in the proof column. In case of failure to clear the proof register, the blinder or shield may be shifted to ineffective position to permit comparison of the entry in the proof column with the corresponding entry in the old-balance column.

According to the present embodiment of the invention, provision is made of a collating table on which may be positioned a ledger-sheet, and also, if desired, a similar statement-sheet superposed on the ledger-sheet and having substantially the same arrangement of columns as the ledger-sheet; and of tally-strip mechanism to feed around the platen a tally-strip of which a portion exposed at one side of the ledger-sheet may be used as a proof column. Preferably the tally-strip is of sufficient width to receive carbon-copies of the entries in the debits and credits columns. The feature of using a portion of the tally-strip as a proof column permits the omission of the proof column on the ledger-sheet, and, consequently, on the statement-sheet which usually has the same arrangement of columns as the ledger-sheet. The proof column on both ledger-sheet and statement-sheet is thus rendered unnecessary and, in the case of the statement-sheet, is especially objectionable, in that the entries in the proof column are of no value to the customer and merely tend to confuse him. Heretofore, it has been proposed to provide the statement-sheet with a line of perforations, between the proof column and the balance column, to permit the proof column to be torn off and discarded. This practice is objectionable due to the waste of paper and of the time required to detach such proof column. Obviously, this objectionable feature is avoided by the present arrangement.

Other features and advantages will hereinafter appear.

In the accompanying drawings.

Figure 1:
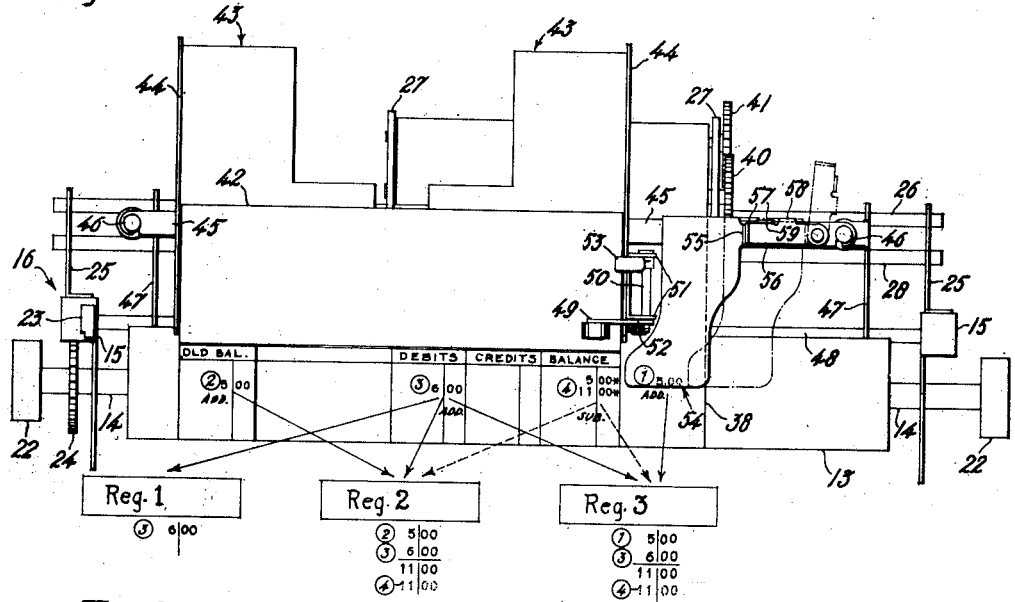
Figure 1 is a front elevation of a portion of an Underwood bookkeeping machine, illustrating one form of the invention; the manner in which the entries are run into the various registers being shown diagrammatically.
Figure 2:
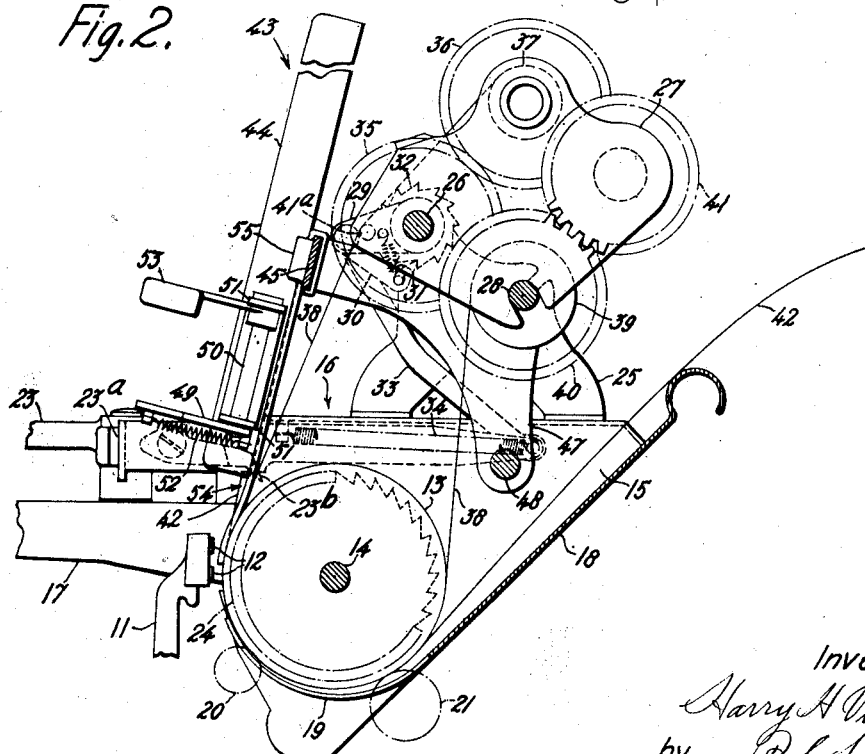
Figure 2 is a side elevation, partly in section, of substantially the same structure as shown in Figure 1.

Upon depression of type-keys (not shown), type-bars 11 are swung upwardly and rearwardly to cause types 12 to print on a platen 13, journaled by means of an axle 14 in the ends 15 of a platen-frame 16, mounted in a traveling carriage 17. The carriage is provided with a usual rear paper-table 18, a paper-apron 19 extending around the bottom of the platen, and front and rear feed-rolls 20 and 21, respectively co-operating with the platen at the bottom thereof. The platen may be rotated either by finger-wheels 22 at the opposite ends of the axle or by line-space mechanism, comprising a line-space lever 23, a line-space slide 23$^a$, a pawl 23$^b$ and a ratchet-wheel 24 fixed on the platen-axle.

Mounted on the ends of the platen-frame are brackets 25, in which is journaled a transverse shaft 26 for driving suitable tally-strip mechanism. Said shaft 26 is also journaled in end plates 27 of the tally-strip mechanism and assists in supporting the same. The plates 27 of the tally-strip mechanism are also supported by means of a rod 28, detachably mounted in the brackets 25. To actuate the shaft provision is made of an arm 29, loosely mounted thereon, near its left end, and of a pawl 30 pivoted on the arm and urged by a spring 31 into engagement with a ratchet-wheel 32, fixed on shaft 26, the arm being pivotally connected at its outer end with a link 33, also connected to the line-space slide 23$^a$, so that, upon movement of the latter rearwardly against the action of a spring 34, the shaft 26 is advanced one step. Upon such actuation of the shaft, a gear 35 thereon acts to rotate a second gear 36 connected with a reel 37 to wind up a tally-strip 38 as the platen is line-spaced. The tally-strip is drawn from a spool 39, loosely mounted on the rod 28, for supporting the plates 27, and having fixed thereto a gear 40 meshing with a gear 41 connected with a brake-device (not shown), so as to resist the advance of the tally-strip around the platen and over a guide 41$^a$ to the reel 37. The tally-strip mechanism may be substantially the same as that disclosed in the patent to Frederick A. Hart, No. 1,281,160, dated October 8, 1918.

For use in connection with a ledger-sheet 42, and, if desired, with a statement-sheet (not shown), a collating table 43, having fixed edge gages 44, is mounted at the delivery side of the platen, by means of a transverse bar 45, having slotted ends to engage with headed studs 46 mounted on brackets 47 supported by a transverse rod 48 connecting the ends of the platen-frame, and by the shaft 26 and rod 28. The table 43 may comprise two separate end portions suitably attached to said bar 45. Provision is also made of a clamping finger 49, fixed on a shaft 50, journaled in brackets 51, on the right-hand edge gage of the table, so that the clamping finger may be swung into and out of engagement with the table, provision being made of a spring 52, so connected to the finger and to the bracket as to hold the clamping finger either in effective or ineffective position when moved thereto. The clamping finger may be swung from either position to the other by means of a finger-piece 53, fixed on the shaft 50.

As herein disclosed, the ledger-sheet 42 is provided with an old-balance column, a debits column, a credits column and a balance column, the usual proof column being omitted, for reasons hereinbefore stated, so that the items usually entered therein may be typed on the exposed portion of the tally-strip, which is also wide enough to receive copies of the entries in the debits, credits and balance columns. As shown diagrammatically in Figure 1, the bookkeeping machine is so set that an entry (1) on the exposed portion of the tally-strip mechanism is run into a proving register herein referred to as register 3; an entry (2) in the old-balance column is run into a register referred to as register 2; an entry (3) in the debits column is run into registers 2 and 3, and also into an accumulating register referred to as register 1; and an entry (4) in the balance column is substracted out of registers 2 and 3 if such entry is positive. It will be seen that for convenience the entries are so numbered on Figure 1 as to indicate the order in which they are made.

According to the present form of the invention, provision is made of a blinder or shield 54, slidably mounted on the bar 45, for movement to and from an effective position (Figure 1) to cover, above the printing line, the portion of the tally-strip 38 projecting beyond the edge of the ledger-sheet, the shield being slidable along the bar to a position to expose the portion of the tally-strip usually covered thereby. For convenience in moving the shield 54, provision may be made, at the right-hand edge thereof, of a lug 55 which may also be of use in locking the shield in its effective position. Such locking may be effected by means of a pivoted latch 56, lying along the bar 45 when in effective position, and having a forwardly-projecting lug 57 at its end engaging with the lug 55 on the shield 54. To prevent movement of the latch 56 below its effective position, it may be provided with a rearwardly-projecting lug 58 to engage the upper surface of the bar, and, for convenience in shifting, the latch may be provided with a forwardly-extending fingerpiece 59. In Figure 1, the latch 56 is shown in full lines in its effective position, and in dot-and-dash lines in its ineffectve position.

An example of the use of the invention is given in Figure 1. A ledger-sheet 42, corresponding to the account of a customer, is adjusted on the paper-table 43, as shown in Figure 1, and the balance 5.00 shown in the balance column is typed on the exposed portion of the tally strip and concomitantly run into the proving register 3. The platen is then line-spaced and the carriage moved to the right, by actuation of the line-space lever 23, to make an entry in the old-balance column, the entry in the proof column on the tally-strip being moved behind the shield by the line-spacing operation. The old balance 5.00 is typed in the old-balance column and run into the computing register; the debit item 6.00 is typed in the debit column and run into registers 1, 2 and 3; and the result shown in register 2 is then typed in the balance column and substracted in both registers 2 and 3, clearing register 2 and also register 3 if the entry in the old-balance column is the same as the entry in the proof column. Failure to clear register 3 shows that the entries made on the tally-strip and in the old-balance column do not agree. If desired, the shield may be moved to ineffective position to expose the entry made in the proof column on the tally-strip. In this connection, it should be understood that usually a statement-sheet is prepared concomitantly with the posting on the ledger-sheet.

Although the proof column is disclosed herein as located on the tally-strip, it would be feasible to use a shield with a ledger-sheet having a proof column.

The result in the accummulating register 1 at the end of the operation of posting a plurality of ledger-sheets may be used for comparison with the summation of the debits and credits obtained by another operator. If the results do not agree reference may be made to the tally-strip to check the debit and credit entries.

Variations may be resorted to within the scope of the invention, and portions of the improvements may be used without others.

Having thus described my invention, I claim.

1. In a combined typewriting and computing machine, a platen, a carriage therefor, and means for effecting a ledger posting and proving the same, comprising a shield on the carriage to cover in one column a copy of the balance at the end of the last posting, so that a second copy of said balance, made in another column, cannot be copied from the first copy but must be copied from some other entry.

2. In a combined typewriting and computing machine, a platen, a carriage therefor, and means for effecting a ledger posting and proving the same, comprising a shield on the carriage to cover in one column a copy of the balance at the end of the last posting, so that a second copy of said balance, made in another column, cannot be copied from the first copy but must be copied from some other entry, and a mounting for said shield permitting movement thereof from effective position.

3. In a combined typewriting and computing machine, a platen, a carriage therefor, and means for effecting a ledger posting and proving the same, comprising a shield on the carriage to cover in one column a copy of the balance at the end of the last posting, so that a second copy of said balance, made in another column, cannot be copied from the first copy but must be copied from some other entry, and a mounting for said shield permitting sliding movement thereof from effective position.

4. In a combined typewriting and computing machine, a platen, a carriage therefor, and means for effecting a ledger posting and proving the same, comprising a shield on the carriage to cover in one column a copy of the balance at the end of the last posting, so that a second copy of said balance, made in another column, cannot be copied from the first copy but must be copied from some other entry, a mounting for said shield permitting movement thereof from effective position, and means for latching said shield in effective position.

5. In a combined typewriting and computing machine, a platen, a carriage therefor, and means for effecting a ledger posting and proving the same, comprising a shield on the carriage to cover in one column a copy of the balance at the end of the last posting, so that a second copy of said balance, made in another column, cannot be copied from the first copy but must be copied from some other entry, and a guide substantially parallel to the platen axis on which said shield is slidable to and from effective position.

6. In a combined typewriting and computing machine, a platen, a carriage therefor, and means for effecting a ledger posting and proving the same, comprising a shield on the carriage to cover in one column a copy of the balance at the end of the last posting, so that a second copy of said balance, made in another column, cannot be copied from the first copy but must be copied from some other entry, a guide substantially parallel to the platen axis on which said shield is slidable to and from effective position, and a latch to prevent such sliding movement.

7. In a combined typewriting and computing machine, a platen, a carriage therefor, and means for effecting a ledger posting and proving the same, comprising a shield on the carriage to cover in one column a copy of the balance at the end of the last posting, so that a second copy of said balance, made in another column, cannot be copied from the first copy but must be copied from some other entry, a guide substantially parallel to the platen axis on which said shield is slidable to and from effective position, and a latch for said shield pivoted on said guide for movement to and from effective position.

8. In a combined typewriting and computing machine, a platen, a carriage therefor, and means for effecting a ledger posting and proving the same, comprising a shield on the carriage to cover in one column a copy of the balance at the end of the last posting, so that a second copy of said balance, made in another column, cannot be copied from the first copy but must be copied from some other entry, a guide substantially parallel to the platen axis on which said shield is slidable to and from effective position, and a latch for said shield pivoted on said guide for movement to and from effective position, and having a lug projecting therefrom to stop said latch when moved to effective position.

9. In a combined typewriting and computing machine, a platen, a carriage therefor, and means for effecting a ledger posting and proving the same, comprising a shield on the carriage to cover in one column a copy of the balance at the end of the last posting, so that a second copy of said balance, made in another column, cannot be copied from the first copy but must be copied from some other entry, a guide substantially parallel to the platen axis on which said shield is slidable to and from effective position, and a latch for said shield pivoted on said guide for movement to and from effective position, and having a lug projecting therefrom to stop said latch when moved to effective position, and a finger-piece projecting therefrom to facilitate the control thereof.

10. In a combined typewriting and computing machine, a traveling carriage, a platen therein, a computing register to receive entries in columnar positions along the platen corresponding to an old balance, a debit, a credit and a balance, a register to receive an entry in a proof columnar position and also entries in said debit, credit and balance columnar positions, and a shield on the carriage to cover a proof entry, on typing the same and line-spacing the platen, so that the number when typed again must be copied from a reading other than that in the proof column.

11. In a combined typewriting and computing machine, a traveling carriage, a platen therein, a computing register to receive entries in columnar positions along the platen corresponding to an old balance, a debit, a credit and a balance, a register to receive an entry in a proof columnar position and also entries in said debit, credit and balance columnar positions, and means to cover a proof entry after the typing thereof in a proof columnar position, and to keep said proof entry covered irrespective of the position of the carriage.

12. In a combined typewriting and computing machine, a platen, and means for effecting a ledger posting and proving the same, comprising a shield to cover and conceal a column of figures adjacent another column from which entries are to be copied in the course of the posting to prevent confusion of the columns by the operator, and means for supporting the shield fixed and immovable relatively to the platen to compel the shield to be maintained in effective position at all times.

13. In a combined typewriting and computing machine, a platen, a platen-frame, and means for effecting a ledger posting and proving the same, comprising a pair of brackets fixed on the platen-frame, a bar extending lengthwise of the platen and mounted on the brackets above the line of writing, and a shield fixedly and immovably mounted on the bar to travel with the platen, said shield extending downward toward the line of writing to conceal the figures above the line of writing in a predetermined zone of the platen to prevent copying from said figures.

14. In a typewriting machine, the combination with a platen, of means for locating a record-sheet laterally upon the platen, means for locating a work-sheet laterally over the record-sheet, leaving a side margin of the record-sheet exposed to the types, and a column-screen mounted over said exposed margin, extending down to a point just above the printing line, and covering up amounts previously typed upon the exposed margin of the record-sheet.

HARRY H. VICKERS.